(12) United States Patent
Lu

(10) Patent No.: US 11,189,322 B1
(45) Date of Patent: Nov. 30, 2021

(54) SUPPORT ASSEMBLY

(71) Applicants: Inventec (Pudong) Technology Corporation, Shanghai (CN); INVENTEC CORPORATION, Taipei (TW)

(72) Inventor: Xiaogang Lu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 17/151,850

(22) Filed: Jan. 19, 2021

(30) Foreign Application Priority Data

May 29, 2020 (CN) .......................... 202010479590.6

(51) Int. Cl.
*G11B 33/02* (2006.01)
(52) U.S. Cl.
CPC .................................. *G11B 33/022* (2013.01)
(58) Field of Classification Search
None
See application file for complete search history.

(56) References Cited

U.S. PATENT DOCUMENTS

| | | | | |
|---|---|---|---|---|
| 5,682,291 A | * | 10/1997 | Jeffries | G06F 1/184 312/223.2 |
| 9,105,309 B2 | * | 8/2015 | Li | G11B 33/128 |
| 10,732,680 B1 | * | 8/2020 | Lu | G11B 33/1406 |
| 2015/0043152 A1 | * | 2/2015 | Zhang | G11B 33/124 361/679.37 |
| 2019/0057725 A1 | * | 2/2019 | Yang | G11B 33/128 |

\* cited by examiner

*Primary Examiner* — William J Klimowicz
(74) *Attorney, Agent, or Firm* — Locke Lord LLP; Tim Tingkang Xia, Esq.

(57) ABSTRACT

The disclosure provides a support assembly including a tray, a hard disk drive chassis and two engagement components. The hard disk drive chassis is placed on the tray. The hard disk drive chassis includes a bottom part, a first and a second side part. The first and the second side part are connected to two opposite sides of the bottom part and located close to two vertical walls of the tray. The hard disk drive chassis can accommodate a hard disk drive. The elastic engagement components are respectively disposed on the first and the second side part. The hard disk drive chassis is movable between an engaged position and a released position. When the hard disk drive chassis is moved from the released position to the engaged position, the elastic engagement components are respectively pressed by the vertical walls so as to engage with the hard disk drive.

9 Claims, 7 Drawing Sheets

SUPPORT ASSEMBLY

CROSS-REFERENCE TO RELATED APPLICATIONS

This non-provisional application claims priority under 35 U.S.C. § 119(a) on Patent Application No(s). 202010479590.6 filed in China on May 29, 2020, the entire contents of which are hereby incorporated by reference.

BACKGROUND OF THE INVENTION

Technical Field of the Invention

The disclosure relates to a support assembly, more particularly to a support assembly using elastic engagement components to fix a hard disk drive thereon.

Description of the Related Art

As technology progresses, a server is widely used to assist businesses of a company. The server is equipped with a plurality of hard disk drives to provide functions, such as data storage and data processing.

In general, before the hard disk drive is installed in the server, the hard disk drive is firstly mounted on a support chassis, then the support chassis with the hard disk drive is mounted on a tray of the server. However, one hard disk drive is, conventionally, required to be fixed on one support chassis via four screws, and thus the installation of the hard disk drives on the support chasses requires a lot of screws and time. Therefore, the cost of the installation of the hard disk drives on the support chasses is difficult to be reduced, and it is troublesome to install the hard disk drives on the support chasses.

SUMMARY OF THE INVENTION

The disclosure provides a support assembly which is capable of reducing the cost of the installation of the hard disk drive on the support chassis, and making the installation of the hard disk drive on the support chassis easily.

One embodiment of the disclosure provides a support assembly configured to support a hard disk drive. The support assembly includes a tray, a hard disk drive chassis and two engagement components. The tray includes a plate, a first vertical wall and a second vertical wall. The first vertical wall and the second vertical wall are disposed on the plate and are spaced apart from each other. The hard disk drive chassis is placed on the plate of the tray and located between the first vertical wall and the second vertical wall. The hard disk drive chassis includes a bottom part, a first side part and a second side part. The first side part and the second side part are respectively connected to two opposite sides of the bottom part, the first side part and the second side part are respectively located close to the first vertical wall and the second vertical wall. The bottom part, the first side part and the second side part together form an accommodation space therebetween, and the accommodation space is configured to accommodate the hard disk drive. The elastic engagement components are respectively disposed on the first side part and the second side part. The hard disk drive chassis is movable between an engaged position and a released position. When the hard disk drive chassis is in the engaged position, the elastic engagement components are respectively pressed by the first vertical wall and the second vertical wall so as to be configured to engage with the hard disk drive. When the hard disk drive chassis is in the released position, the elastic engagement components are not pressed by the first vertical wall and the second vertical wall so as to be configured to detach from the hard disk drive.

According to the support assembly as discussed above, the elastic engagement components are respectively disposed on the first side part and the second side part of the hard disk drive chassis, and the first side part and the second side part of the hard disk drive chassis are respectively located close to the first vertical wall and the second vertical wall of the tray, such that the engagement components are respectively pressed by the first vertical wall and the second vertical wall so as to engage with the hard disk drive placed on the hard disk drive chassis as the hard disk drive chassis is moved to the engaged position. Therefore, the hard disk drive can be fixed on the hard disk drive chassis without any screws, and thus the cost in purchasing the screws can be saved, and the hard disk drive can be easily installed on the hard disk drive chassis.

BRIEF DESCRIPTION OF THE DRAWINGS

The present disclosure will become more fully understood from the detailed description given hereinbelow and the accompanying drawings which are given by way of illustration only and thus are not limitative to the present disclosure and wherein.

DETAILED DESCRIPTION

Figure 1:
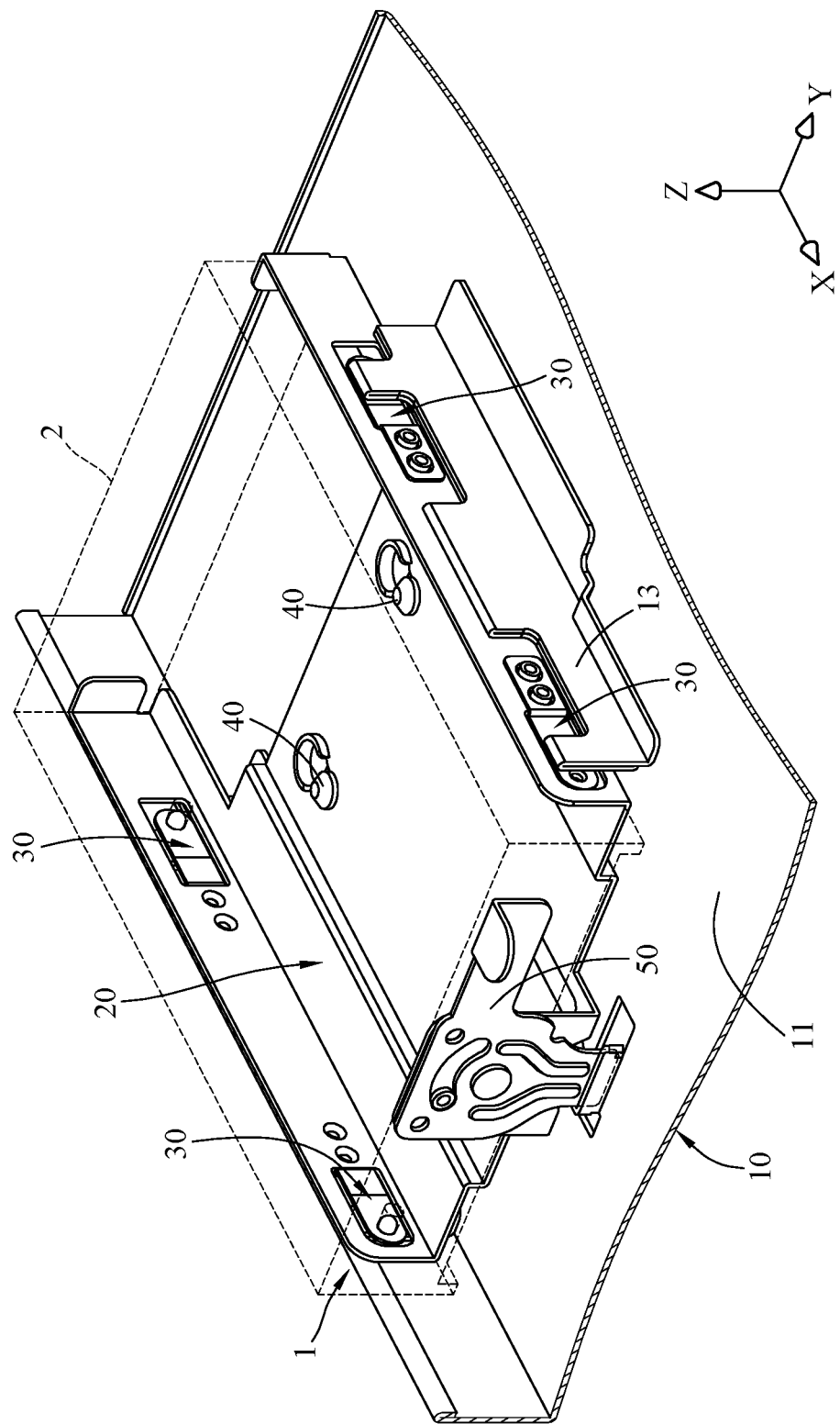
FIG. 1 is a perspective view of a support assembly according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the following embodiments are disclosed by the figures, and some practical details are described in the following paragraphs, but the present disclosure is not limited thereto. Furthermore, for the purpose of illustration, some of the structures and components in the figures are simplified, and wires, reference lines or buses are omitted in some of the figures.

Moreover, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
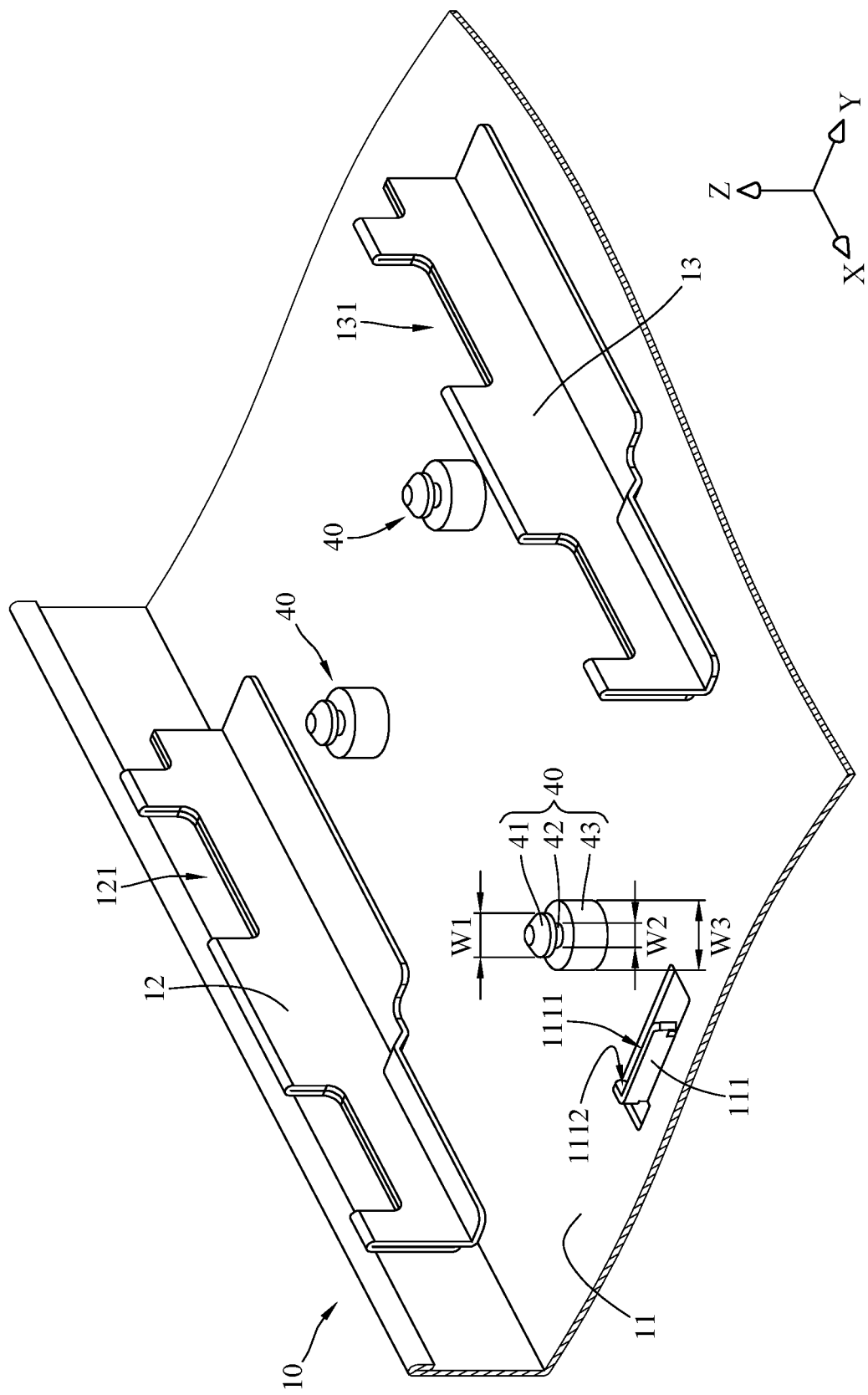
FIG. 2 is a perspective view of a tray of the support assembly in FIG. 1.
Figure 3:
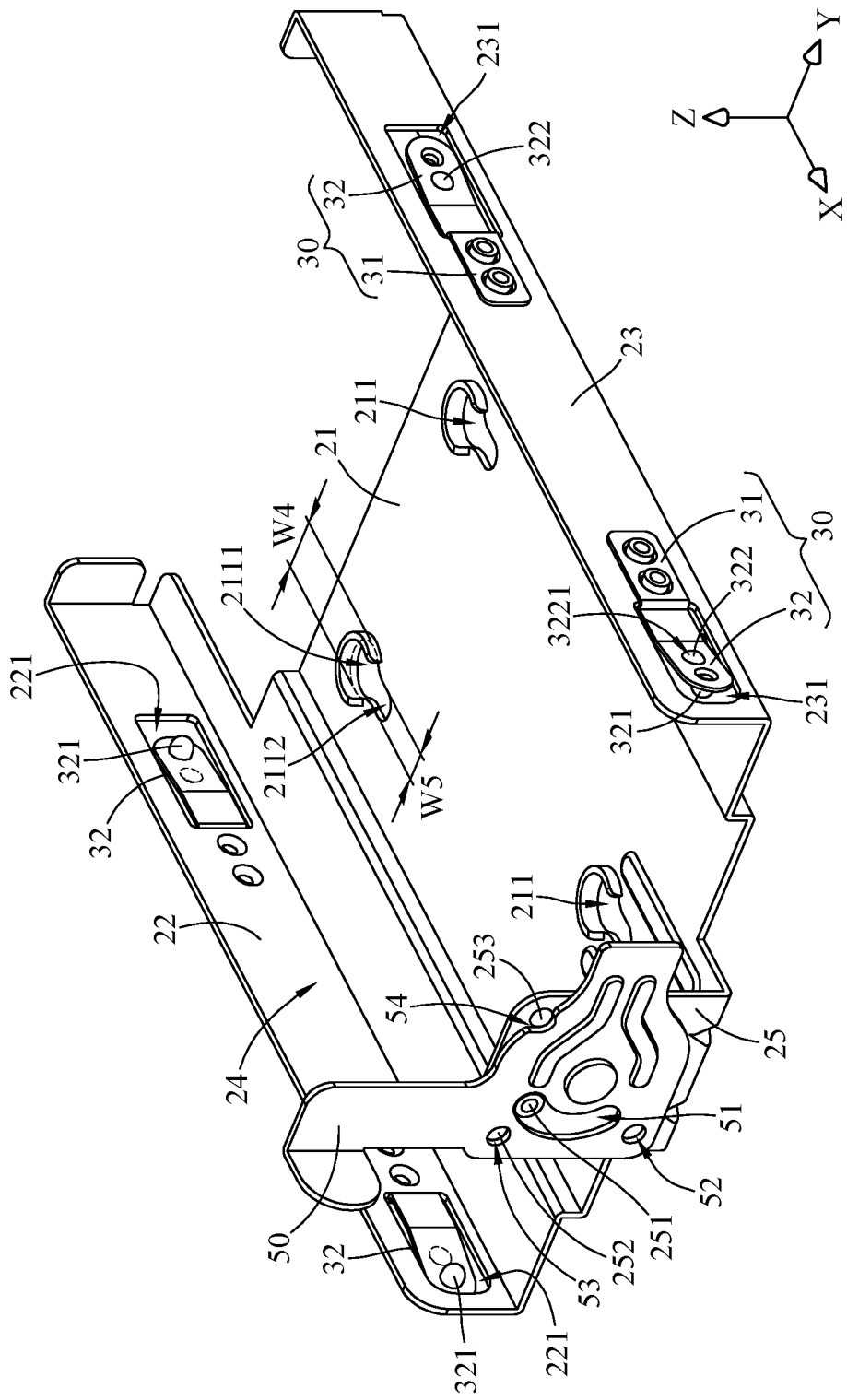
FIG. 3 is a perspective view of a hard disk drive chassis and a positioning component of the support assembly in FIG. 1.

Referring to FIGS. 1 to 3, there are shown a perspective view of a support assembly 1 according to a first embodiment of the disclosure, a perspective view of a tray 10 of the support assembly 1 in FIG. 1, and a perspective view of a hard disk drive chassis 20 and a positioning component 50 of the support assembly 1 in FIG. 1.

In this embodiment, the support assembly 1 includes the tray 10, the hard disk drive chassis 20 and a plurality of elastic engagement components 30. In addition, in this or another embodiment, the support assembly 1 may further include a plurality of engagement components 40 and the positioning component 50.

The tray 10 includes a plate 11, a first vertical wall 12 and a second vertical wall 13. The first vertical wall 12 and the second vertical wall 13 are disposed on the plate 11 and spaced apart from each other. In this embodiment, the first vertical wall 12 has a recess 121, and the second vertical wall 13 has a recess 131.

The engagement components 40 are disposed on the plate 11. The engagement components 40 are the same in structure, and thus the following only introduces one of them. The engagement component 40 includes a head portion 41, a neck portion 42 and a body portion 43. The neck portion 42 is located between and connected to the head portion 41 and the body portion 43, and one end of the body portion 43 located away from the neck portion 42 is fixed on the plate 11. A width W1 of the head portion 41 and a width W3 of the body portion 43 are larger than a width W2 of the neck portion 42.

The hard disk drive chassis 20 includes a bottom part 21, a first side part 22 and a second side part 23. The first side part 22 and the second side part 23 are respectively connected to two opposite sides of the bottom part 21, and the bottom part 21, the first side part 22 and the second side part 23 together form an accommodation space 24 therebetween. The accommodation space 24 of the hard disk drive chassis 20 is configured to accommodate a hard disk drive 2.

The bottom part 21 of the hard disk drive chassis 20 has a plurality of engagement holes 211. The engagement holes 211 are the same in structure, so the following only introduces one of them. The engagement hole 211 has a wide portion 2111 and a narrow portion 2112 connected to each other. A width W4 of the wide portion 2111 is larger than a width W5 of the narrow portion 2112. The width W1 of the head portion 41 of the engagement component 40 is smaller than the width W4 of the wide portion 2111 of the engagement hole 211 and is larger than the width W5 of the narrow portion 2112. The width W2 of the neck portion 42 is smaller or equal to the width W5 of the narrow portion 2112 of the engagement hole 211. The width W3 of the body portion 43 is larger than the width W4 of the wide portion 2111 of the engagement hole 211.

The first side part 22 has two through holes 221 spaced apart from each other, and the second side part 23 also has two through holes 231 spaced apart from each other. The through holes 221 and 231 are connected to the accommodation space 24 of the hard disk drive chassis 20. Each of the elastic engagement components 30 includes a fixed portion 31 and an engagement portion 32 connected to each other. The fixed portions 31 are respectively fixed on the first side part 22 and the second side part 23, and the fixed portions 31 are respectively located close to the through holes 221 of the first side part 22 and the through holes 231 of the second side part 23. Each of the engagement portions 32 has an engagement protrusion 321 and a contact protrusion 322. The engagement protrusion 321 and the contact protrusion 322 are formed by, for example, a stamping process. The engagement protrusions 321 protrude toward the accommodation space 24 of the hard disk drive chassis 20, and the engagement protrusions 321 are, for example, respectively disposed through the through holes 221 of the first side part 22 and the through holes 231 of the second side part 23 while not experiencing any external force. The contact protrusions 322 protrude away from the accommodation space 24 of the hard disk drive chassis 20, and each of the contact protrusions 322 has a curved surface 3221.

In this embodiment, the hard disk drive chassis 20 further includes a front part 25. The front part 25 is connected to the bottom part 21, and the front part 25, the first side part 22 and the second side part 23 are respectively located at different sides of the bottom part 21. The positioning component 50 is rotatably disposed on the front part 25, and the positioning component 50 is movable between an initial position and a contact position. The front part 25 has a guiding protrusion 251, a first positioning bump 252 and a second positioning bump 253, and the positioning component 50 has a guiding hole 51, a first positioning hole 52, a second positioning hole 53 and a recess 54. The guiding protrusion 251 is movably located in the guiding hole 51. In addition, the plate 11 of the tray 10 has a stopper 111, and the stopper 111 has two contact surfaces 1111 and 1112 respectively facing different directions.

Figure 4:
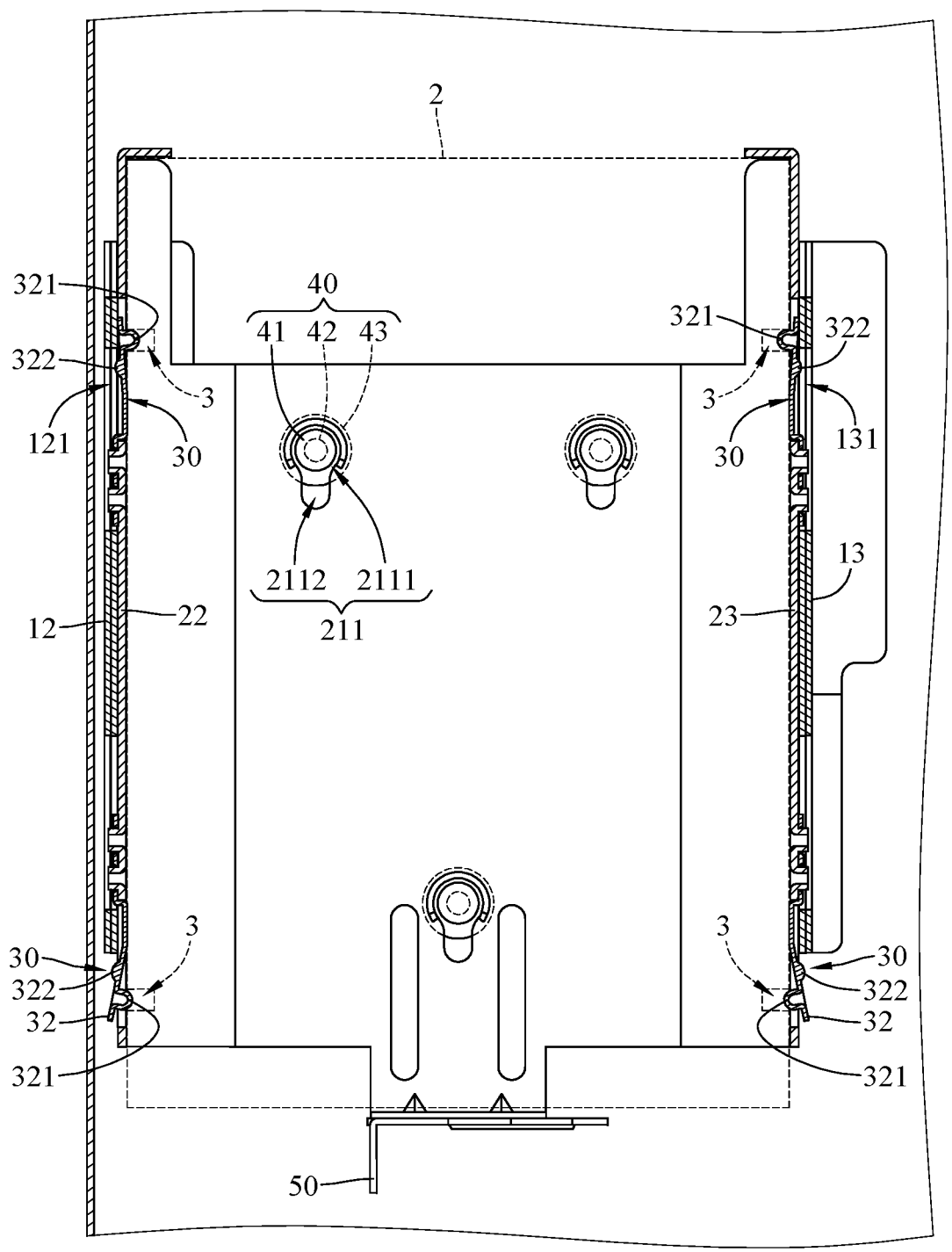
FIG. 4 is a top view of the support assembly in FIG. 1 when the hard disk drive chassis is placed on the tray and in a released position.
Figure 5:
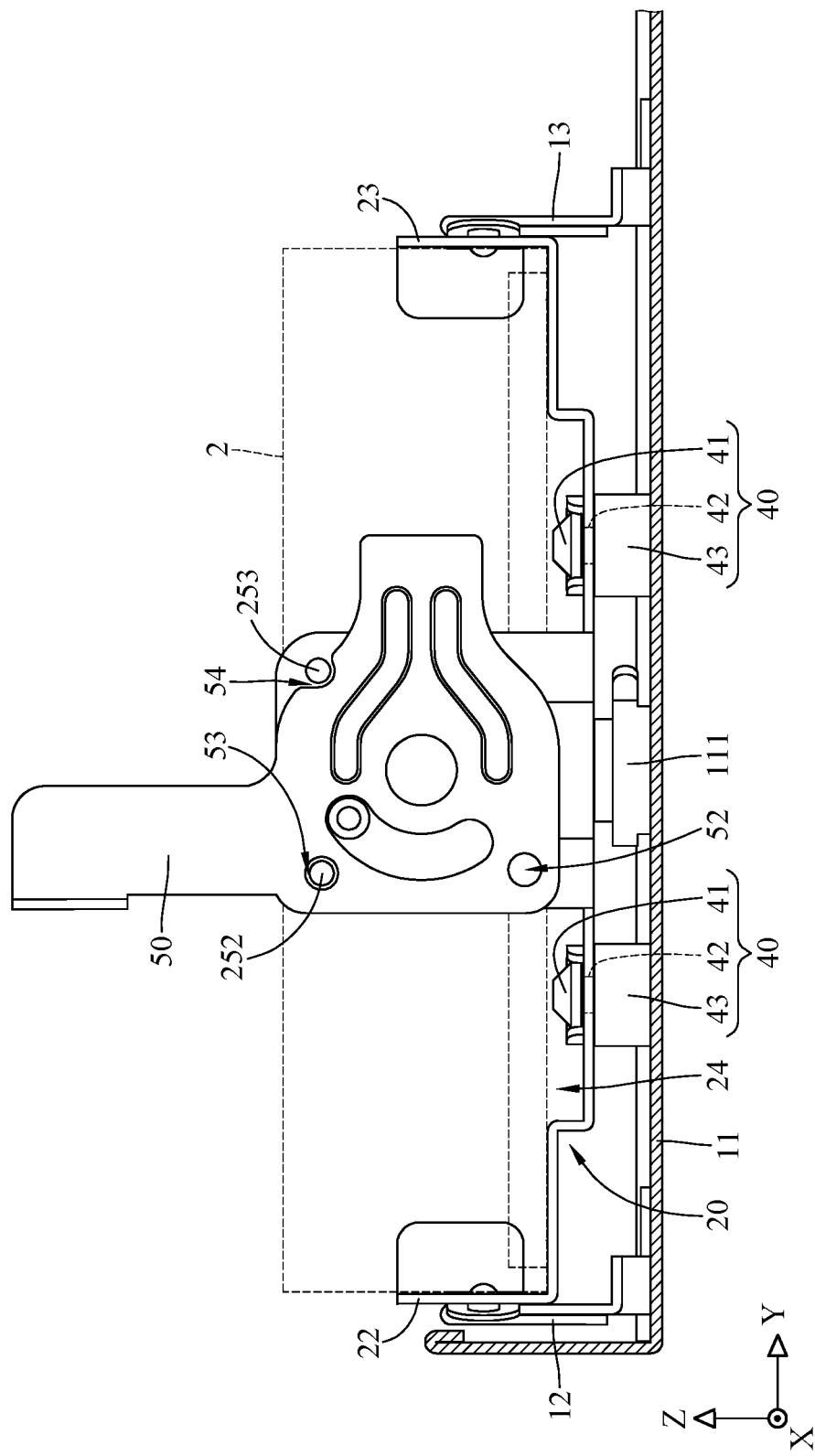
FIG. 5 is a front view of the support assembly in FIG. 1 when the hard disk drive chassis is placed on the tray and in the released position.

Then, the following paragraphs will describe the installation of the hard disk drive 2 onto the tray 10. Referring to FIGS. 4 and 5, there are shown a top view of the support assembly 1 in FIG. 1 when the hard disk drive chassis 20 is placed on the tray 10 and in the released position and a front view of the support assembly 1 in FIG. 1 when the hard disk drive chassis 20 is placed on the tray 10 and in the released position. For the purpose of illustration, 3D coordinate including an X-axis, a Y-axis and Z-axis perpendicular to one another is firstly defined, where the Y axis is parallel to a normal line of a surface of the second vertical wall 13 facing the first vertical wall 12, and the Z-axis is parallel to a normal line of an upper surface of the plate 11.

Firstly, the positioning component 50 is positioned in the initial position, and the first positioning bump 252 and the second positioning bump 253 are respectively located in the second positioning hole 53 and the recess 54. Then, the hard disk drive 2 is placed in the accommodation space 24 of the hard disk drive chassis 20, such that the engagement protrusions 321 of the engagement portions 32 of the elastic engagement components 30 are, for example, respectively and slightly inserted into recesses 3 of the hard disk drive 2. Then, the head portions 41 of the engagement components 40 respectively pass through the wide portions 2111 of the engagement holes 211, such that the neck portions 42 of the engagement components 40 are respectively located at the wide portions 2111 of the engagement holes 211. At this moment, the hard disk drive chassis 20 is partially located between the first vertical wall 12 and the second vertical wall 13 of the tray 10, and the first side part 22 and the second side part 23 are respectively located close to the first vertical wall 12 and the second vertical wall 13. And the hard disk drive chassis 20 is in a released position, the contact portions 322 of two engagement portions 32 located relatively close to the positioning component 50 are respectively located outside the first vertical wall 12 and the second vertical wall 13, and the contact portions 322 of the other two engagement portions 32 located away from the positioning component 50 are respectively located in the recesses 121 of the first vertical wall 12 and the recesses 131 of the second vertical wall 13, such that the engagement portions 32 of the contact protrusions 322 are not pressed by the first vertical wall 12 and the second vertical wall 13.

Figure 6:
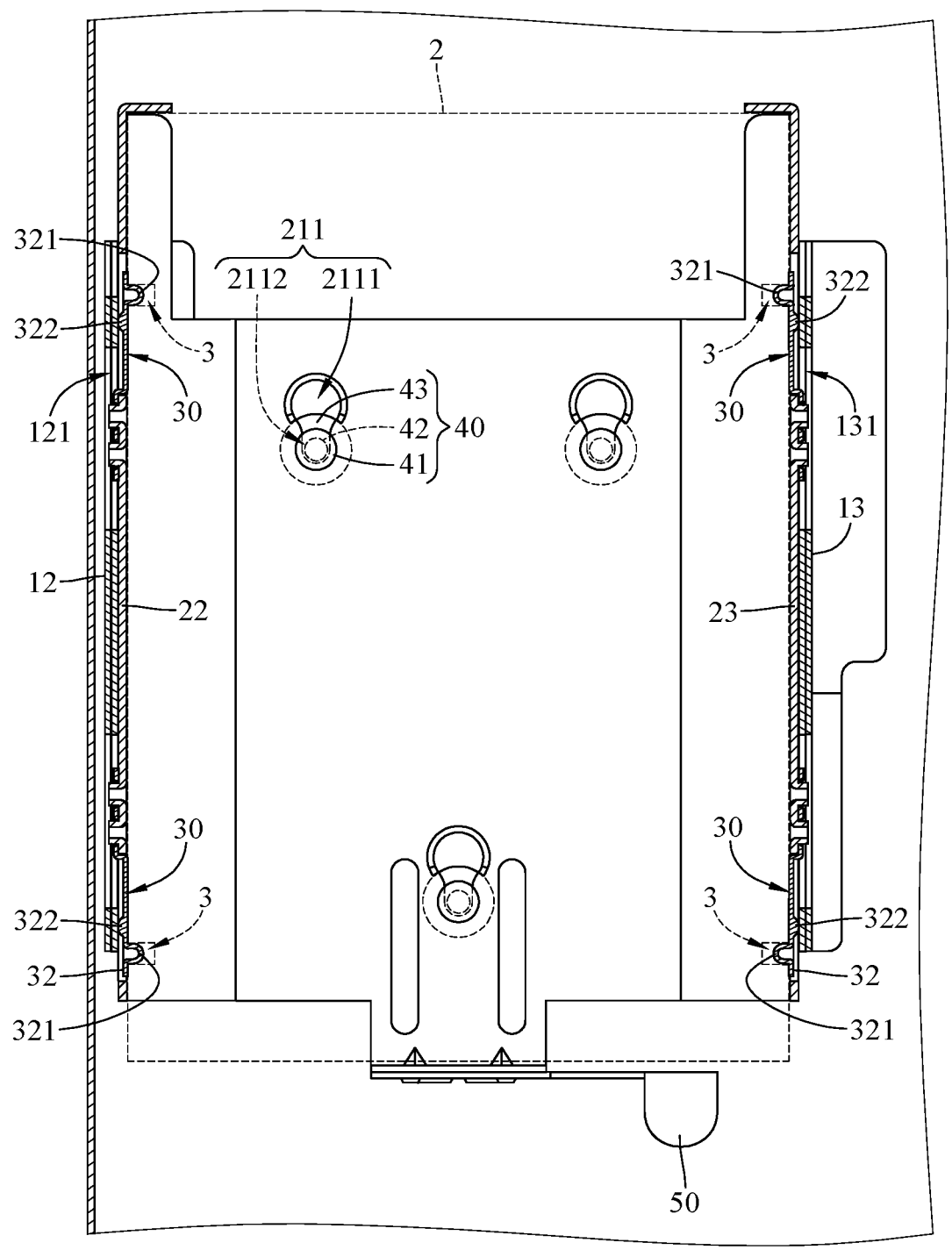
FIG. 6 is a top view of the support assembly in FIG. 1 when the hard disk drive chassis is placed on the tray and in an engaged position.
Figure 7:
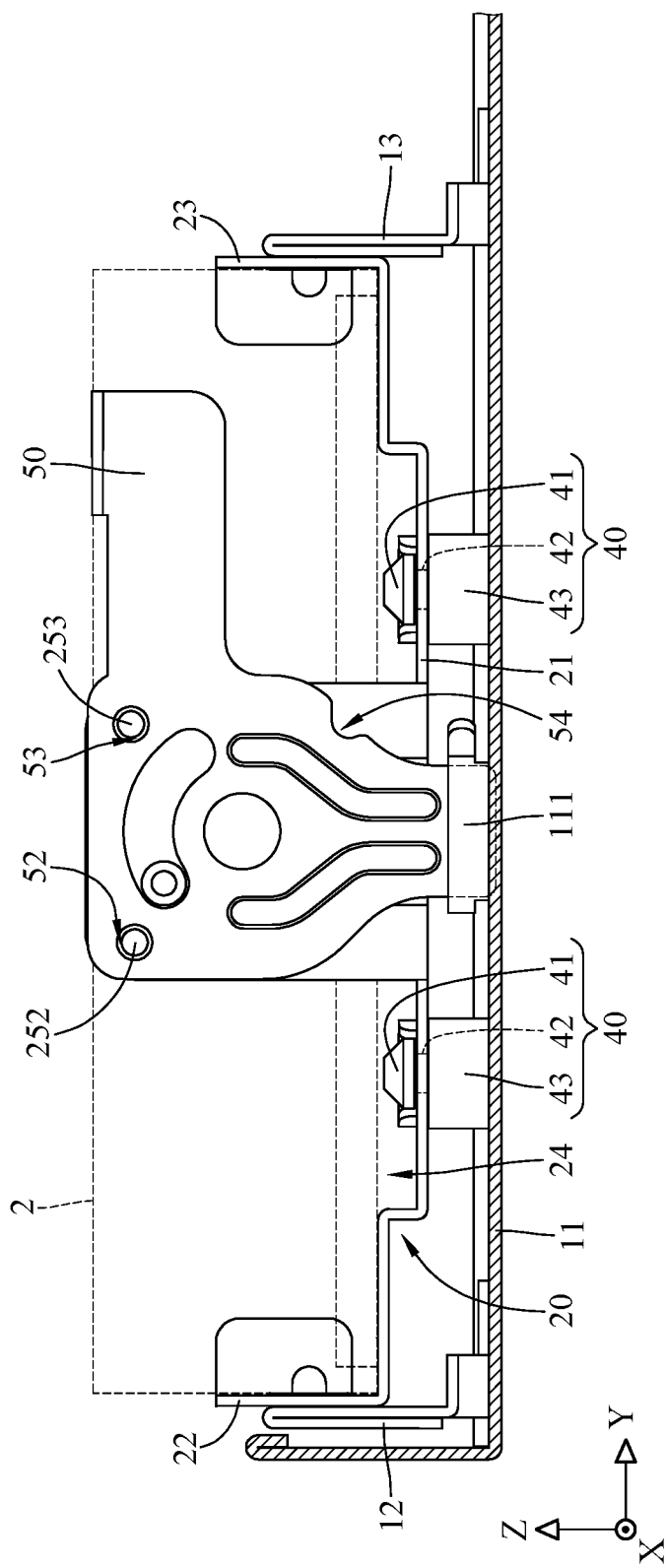
FIG. 7 is a front view of the support assembly in FIG. 1 when the hard disk drive chassis is placed on the tray and in the engaged position.

Then, referring to FIGS. 6 and 7, there are shown a top view of the support assembly 1 in FIG. 1 when the hard disk drive chassis 20 is placed on the tray 10 and in the engaged position and a front view of the support assembly 1 in FIG. 1 when the hard disk drive chassis 20 is placed on the tray 10 and in the engaged position.

The entire hard disk drive chassis 20 is moved along the negative X-axis direction, such that the first vertical wall 12 and the second vertical wall 13 respectively press against the contact protrusions 322 of the elastic engagement components 30 so as to move the engagement protrusions 321 of the elastic engagement components 30 further into the recesses 3 of the hard disk drive 2. When the hard disk drive chassis 20 is moved from the released position to an engaged position, the engagement protrusions 321 are maintained inserted into the recesses 3 of the hard disk drive 2 by the pressure of the first vertical wall 12 and the second vertical wall 13. As a result, the movement of the hard disk drive 2 along the positive and negative Z-axis direction is limited by the engagement protrusions 321, thereby fixing the hard disk drive 2 on the hard disk drive chassis 20. Therefore, the hard disk drive 2 can be fastened to the hard disk drive chassis 20 without any screws, and thus the cost in purchasing the screws can be saved, and the hard disk drive 2 can be easily installed on the hard disk drive chassis 20.

On the other hand, when the hard disk drive chassis 20 is in the engaged position, the movement of the hard disk drive chassis 20 in the positive and negative Y-axis direction is limited by the first vertical wall 12 and the second vertical wall 13. In addition, when the hard disk drive chassis 20 is in the engaged position, the neck portions 42 of the engagement components 40 are respectively located at the narrow portions 2112 of the engagement holes 211, and the bottom part 21 of the hard disk drive chassis 20 is located between the head portions 41 of the engagement components 40 and the plate 11 of the tray 10. More specifically, the bottom part 21 of the hard disk drive chassis 20 is located between the head portions 41 and the body portions 43 of the engagement components 40. As such, the movement of the hard disk drive chassis 20 in the positive and negative Z-axis direction is limited by the head portions 41 and the body portions 43 of the engagement components 40.

In this embodiment, the curved surfaces 3221 of the contact protrusions 322 of the elastic engagement components 30 are in contact with the first vertical wall 12 and the second vertical wall 13 as the hard disk drive chassis 20 is moved from the released position to the engaged position along the negative X-axis direction, thus the curved surfaces 3221 can guide the movement of the hard disk drive chassis 20. Therefore, the movement of the hard disk drive chassis 20 is smooth.

In this embodiment, the engagement protrusions 321 is not restricted to pass through the through holes 221 and 231 of the first side part 22 and the second side part 23 while not experiencing any external force; in some other embodiments, the engagement protrusions may not pass through the through holes of the first side part and the second side part while not experiencing any external force; that is, the engagement protrusions may not be inserted into the hard disk drive before the hard disk drive chassis is moved from the released position to the engaged position, but be inserted into the hard disk drive after the hard disk drive chassis is moved from the released position to the engaged position.

Then, the positioning component 50 is rotated from the initial position to the contact position. When the positioning component 50 is in the contact position, different sides of the positioning component 50 are respectively in contact with the contact surfaces 1111 and 1112 of the stopper 111 of the plate 11 (as shown in FIG. 2), and the first positioning bump 252 and the second positioning bump 253 are respectively located in the first positioning hole 52 and the second positioning hole 53. As shown in FIG. 2, the contact surface 1111 of the stopper 111 faces toward the negative X-axis direction, thus the movement of the hard disk drive chassis 20 along the positive X-axis direction is limited by the stopper 111 as the positioning component 50 is in contact with the contact surface 1111 of the stopper 111. In addition, the cooperation of the narrow portions 2112 of the engagement holes 211 and the neck portions 42 of the engagement components 40 limits the movement of the hard disk drive chassis 20 in the negative X-axis direction.

The following will describe the steps of removing the hard disk drive chassis 20 from the tray 10. Firstly, the positioning component 50 is rotated from the contact position to the initial position so as to detach from the stopper 111 of the plate 11. Then, the hard disk drive chassis 20 is moved along the positive X-axis direction, such that the neck portions 42 of the engagement components 40 are respectively located at the wide portions 2111 of the engagement holes 211. At this moment, the hard disk drive chassis 20 can be removed from the tray 10 along the positive Z-axis direction. After the hard disk drive chassis 20 is removed from the tray 10, the hard disk drive 2 can be removed from the hard disk drive chassis 20 by slightly moving the elastic engagement components 30 to make the engagement protrusions 321 detach from the recesses 3 of the hard disk drive 2.

In this embodiment, the cooperation of the guide hole 51 of the positioning component 50 and the guide protrusion 251 of the front part 25 can limit he movement range of the positioning component 50 so as to prevent the positioning component 50 from being overly rotated. In this embodiment, the front part 25 has the guiding protrusion 251, and the positioning component 50 has the guiding hole 51, but the present disclosure is not limited thereto; in some other embodiments, the positioning component may have the guiding hole, and the front part may have the guiding protrusion; in another embodiment, the front part may have no guiding protrusion, and the positioning component may have no guide hole.

Moreover, the contact surface 1112 of the stopper 111 is able to stop the positioning component 50 at the contact position, which ensures that the positioning component 50 is positioned in the contact position.

Furthermore, the cooperation of the first positioning bump 252, the second positioning bump 253, the first positioning hole 52, the second positioning hole 53 and the recess 54 helps the positioning component 50 to be positioned in the initial position or the contact position, such that the possibility of unexpected movement of the positioning component 50 can be reduced.

In this embodiment, the second positioning bump 253 can enter into the recess 54 when the positioning component 50 is rotated from the contact position to the initial position, such that the second positioning bump 253 is prevented from interfering with the positioning component 50.

However, the first positioning bump 252 and the second positioning bump 253 of the front part 25 and the first positioning hole 52, the second positioning hole 53 and the recess 54 of the positioning component 50 are optional; in some other embodiments, the front part may have no first positioning bump and second positioning bump, and the positioning component may have no first positioning hole, second positioning hole and recess.

On the other hand, the quantity of the elastic engagement component 30 are not restricted to be four; in some other embodiments, the support assembly may only have two elastic engagement components. In such configuration, the two elastic engagement components may be the two elastic engagement components 30 located relatively close to or away from the positioning component 50 shown in FIG. 1.

According to the support assembly as discussed above, the elastic engagement components are respectively disposed on the first side part and the second side part of the hard disk drive chassis, and the first side part and the second side part of the hard disk drive chassis are respectively located close to the first vertical wall and the second vertical wall of the tray, such that the engagement components are respectively pressed by the first vertical wall and the second vertical wall so as to engage with the hard disk drive placed on the hard disk drive chassis as the hard disk drive chassis is moved to the engaged position. Therefore, the hard disk drive can be fixed on the hard disk drive chassis without any screws, and thus the cost in purchasing the screws can be saved, and the hard disk drive can be easily installed on the hard disk drive chassis.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A support assembly, configured to support a hard disk drive, comprising:
    a tray, comprising a plate, a first vertical wall and a second vertical wall, wherein the first vertical wall and the second vertical wall are disposed on the plate and are spaced apart from each other;
    a hard disk drive chassis, placed on the plate of the tray and located between the first vertical wall and the second vertical wall, wherein the hard disk drive chassis comprises a bottom part, a first side part and a second side part, the first side part and the second side part are respectively connected to two opposite sides of the bottom part, the first side part and the second side part are respectively located close to the first vertical wall and the second vertical wall, the bottom part, the first side part and the second side part together form an accommodation space therebetween, and the accommodation space is configured to accommodate the hard disk drive; and
    two elastic engagement components, respectively disposed on the first side part and the second side part;
    wherein the hard disk drive chassis is movable between an engaged position and a released position; when the hard disk drive chassis is in the engaged position, the elastic engagement components are respectively pressed by the first vertical wall and the second vertical wall so as to be configured to engage with the hard disk drive; when the hard disk drive chassis is in the released position, the elastic engagement components are not pressed by the first vertical wall and the second vertical wall so as to be configured to detach from the hard disk drive;
    wherein each of the first vertical wall and the second vertical wall has a recess; when the hard disk drive chassis is in the released position, the elastic engagement components are respectively located in the recesses of the first vertical wall and the second vertical wall.

2. The support assembly according to claim 1, wherein each of the first side part and the second side part has a through hole; when the hard disk drive chassis is in the engaged position, the elastic engagement components are respectively pressed by the first vertical wall and the second vertical wall so as to pass through the through holes of the first side part and the second side part.

3. The support assembly according to claim 1, wherein each of the elastic engagement components has an engagement protrusion, the engagement protrusions protrude toward the accommodation space of the hard disk drive chassis; when the hard disk drive chassis is in the engaged position, the elastic engagement components are respectively pressed by the first vertical wall and the second vertical wall, and the engagement protrusions of the elastic engagement components are configured to engage with the hard disk drive.

4. The support assembly according to claim 3, wherein each of the elastic engagement components has a contact protrusion, the contact protrusions protrude away from the accommodation space of the hard disk drive chassis; when the hard disk drive chassis is in the engaged position, the contact protrusions of the elastic engagement components are respectively pressed by the first vertical wall and the second vertical wall.

5. The support assembly according to claim 4, wherein each of the contact protrusions has a curved surface.

6. The support assembly according to claim 1, further comprising at least one engagement component, wherein the at least one engagement component is disposed on the plate of the tray, the bottom part of the hard disk drive chassis has at least one engagement hole, the at least one engagement hole has a wide portion and a narrow portion connected to each other, the wide portion is wider than the narrow portion, the at least one engagement component comprises a head portion and a neck portion connected to each other, the head portion is wider than the neck portion, an end of the neck portion located away from the head portion is connected to the plate of the tray, the head portion is narrower than the wide portion of the at least one engagement hole and wider than the narrow portion of the at least one engagement hole, the neck portion is narrower than the narrow portion of the at least one engagement hole, or the neck portion and the narrow portion of the at least one engagement hole have a same width; when the hard disk drive chassis is in the engaged position, the neck portion of the at least one engagement component is located at the narrow portion of the at least one engagement hole, and the bottom part of the hard disk drive chassis is located between the head portion and the plate of the tray; when the hard disk drive chassis is in the released position, the neck portion of the at least one engagement component is located at the wide portion of the at least one engagement hole.

7. The support assembly according to claim 1, further comprising a positioning component, wherein the hard disk drive chassis further comprises a front part, the front part, the first side part and the second side part are respectively connected to different sides of the bottom part, the positioning component is rotatably disposed on the front part, the plate of the tray has a stopper; when the hard disk drive chassis is in the engaged position, the positioning component is in contact with or detached from the stopper.

8. The support assembly according to claim 7, wherein the front part has a guiding protrusion, the positioning component has a guiding hole, and the guiding protrusion is movably located in the guiding hole.

9. The support assembly according to claim 7, wherein the front part has a first positioning bump and a second positioning bump, the positioning component has a first positioning hole, a second positioning hole and a positioning component, the positioning component is rotatable between an initial position and a contact position; when the positioning component is in the initial position, the first positioning bump and the second positioning bump are respectively located in the second positioning hole and the positioning component; when the positioning component is in the contact position, the first positioning bump and the second positioning bump are respectively located in the first positioning hole and the second positioning hole.

* * * * *